US011052488B2

(12) United States Patent
Yano et al.

(10) Patent No.: US 11,052,488 B2
(45) Date of Patent: Jul. 6, 2021

(54) METHOD FOR MANUFACTURING COMPONENT

(71) Applicant: TOYOTA JIDOSHA KABUSHIKI KAISHA, Toyota (JP)

(72) Inventors: Haruka Yano, Toyota (JP); Yuji Suzuki, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 186 days.

(21) Appl. No.: 16/387,605

(22) Filed: Apr. 18, 2019

(65) Prior Publication Data

US 2019/0358747 A1 Nov. 28, 2019

(30) Foreign Application Priority Data

May 24, 2018 (JP) .............................. JP2018-099636

(51) Int. Cl.
*B23K 26/356* (2014.01)
*B23K 26/064* (2014.01)
*C21D 1/09* (2006.01)
*B23K 26/06* (2014.01)
*B23K 26/53* (2014.01)
*B23K 26/34* (2014.01)

(52) U.S. Cl.
CPC ........ *B23K 26/356* (2015.10); *B23K 26/0643* (2013.01); *B23K 26/34* (2013.01); *B23K 26/53* (2015.10); *C21D 1/09* (2013.01)

(58) Field of Classification Search
None
See application file for complete search history.

(56) References Cited

U.S. PATENT DOCUMENTS

| 6,437,285 B1* | 8/2002 | Thomas | ................ B08B 7/0042 |
| | | | 219/121.75 |
| 6,791,057 B1* | 9/2004 | Kratzsch | ............... B23K 26/032 |
| | | | 219/121.62 |
| 2017/0028509 A1* | 2/2017 | Ledger | .................... F01D 25/18 |
| 2019/0071749 A1 | 3/2019 | Serizawa et al. | |

FOREIGN PATENT DOCUMENTS

| JP | 61-153233 A | * 7/1986 |
| JP | 2006-322446 A | 11/2006 |
| JP | 2011-168845 A | 9/2011 |
| JP | 2016-515475 A | 5/2016 |
| JP | 2019-042775 A | 3/2019 |
| WO | 2014/170868 A1 | 10/2014 |

OTHER PUBLICATIONS

English Translation of JP 61-153233 (originally published Jul. 11, 1986) from J-Plat Pat.*

* cited by examiner

*Primary Examiner* — George Wyszomierski
(74) *Attorney, Agent, or Firm* — Oliff PLC

(57) ABSTRACT

A manufacturing method for a shaft 1 by imparting a residual compressive stress to an inner surface 4p of the lateral hole 4 of the workpiece 2 includes a disposing step and an irradiation step. In the disposing step, a lateral-hole mirror 14a is disposed inside the lateral hole 4. In the irradiation step, a laser beam L is emitted from one of an inner-side opening 4a and an outer-side opening 4b of the lateral hole 4 toward the lateral-hole mirror 14a, making the laser beam L reflect on the lateral-hole mirror 14a, and thereby applying the laser beam L to the inner surface 4p of the lateral hole 4.

6 Claims, 9 Drawing Sheets

METHOD FOR MANUFACTURING COMPONENT

CROSS REFERENCE TO RELATED APPLICATIONS

This application is based upon and claims the benefit of priority from Japanese patent application No. 2018-99636, filed on May 24, 2018, the disclosure of which is incorporated herein in its entirety by reference.

BACKGROUND

The present disclosure relates to a method for manufacturing a component.

Patent Literature 1 (Japanese Unexamined Patent Application Publication No. 2006-322446) discloses a pipe-like common rail that is disposed between a pump and an injector, which are used to supply light oil (i.e., fuel) by using a pressure, in a pressure-accumulating type fuel injection system for a diesel engine. The common rail is configured to accumulate light oil in a pressurized manner. A plurality of branch holes are formed in the common rail. The plurality of branch holes are opened perpendicularly to a rail hole of the common rail.

Further, Patent Literature 1 proposes to impart a residual compressive stress to inner surfaces of the branch holes by performing laser peening thereon in order to improve a fatigue strength of the inner surfaces of the branch holes. Specifically, a laser beam is obliquely applied to the inner surfaces of the branch holes.

Note that the imparting a residual compressive stress by performing laser peening means as follows. That is, laser ablation is performed on a surface of a component by concentrating laser light thereon in the water. As a result, plasma is generated on the surface of the component. The surface of the component is plastically deformed by a shock wave caused by a plasma pressure of this plasma. As a result, a compressive stress occurs on the surface of the component. This compressive stress remains as a residual compressive stress on the surface of the component.

SUMMARY

However, the present inventors have found the following problem. Since the laser beam is obliquely applied to the inner surfaces of the branch holes, it is difficult to narrow a spot diameter of the laser beam. Therefore, the laser peening can be carried out only for shallow areas on the inner surfaces of the branch holes.

An object of the present disclosure is to provide a technique for efficiently imparting a residual compressive stress to a part of an inner surface distant from an outer peripheral surface.

A first exemplary aspect is a method for manufacturing a component by imparting a residual compressive stress to an inner surface of a lateral hole of a hollow cylindrical body by performing laser peening, the hollow cylindrical body including an axial hole and the lateral hole, the axial hole being an internal space of the hollow cylindrical body and extending in a longitudinal direction of the hollow cylindrical body, the lateral hole being opened on an inner peripheral surface and an outer peripheral surface of the hollow cylindrical body, the manufacturing method including: a disposing step of disposing a lateral-hole mirror inside the lateral hole; and an irradiation step of emitting a laser beam from one of the two openings of the lateral hole toward the lateral-hole mirror, making the laser beam reflect on the lateral-hole mirror, and thereby applying the laser beam to the inner surface of the lateral hole. According to the above method, it is possible to efficiently impart a residual compressive stress even to a part of the inner surface of the lateral hole distant from the outer peripheral surface.

Preferably, in the irradiating step, the lateral-hole mirror is rotated around a central axis of the lateral hole, or is moved along the central axis of the lateral hole. According to the above method, it is unnecessary to rotate the hollow cylindrical body itself in order to change the place where the laser peening is performed, so that the time required for manufacturing the component can be reduced.

Preferably, in the irradiating step, the laser beam is applied to at least an area of the inner surface of the lateral hole that is away from the outer peripheral surface in a radially inward direction by a distance equivalent to a minimum inner diameter of the lateral hole. According to the above-described method, a residual compressive stress is imparted to a part of the inner surface of the lateral hole considerably distant from the outer peripheral surface.

Preferably, in the irradiating step, the laser beam is emitted from, of the two openings of the lateral hole, the opening located on the outer peripheral surface toward the lateral-hole mirror. According to the above-described method, the laser beam can be emitted toward the lateral-hole mirror from the outer side.

Preferably, when the hollow cylindrical body further includes an opposed hole opened on the inner peripheral surface and the outer peripheral surface of the hollow cylindrical body, the opposed hole being formed on a side opposite to the lateral hole across a central axis of the axial hole, and having the same central axis as the central axis of the lateral hole, in the disposing step, the lateral-hole mirror is disposed inside the lateral hole by inserting a rod-like lateral-hole mirror rod including the lateral-hole mirror at a tip thereof from the opening of the opposed hole located on the outer peripheral surface toward the lateral hole. According to the above-described method, the lateral-hole mirror can be easily disposed inside the lateral hole.

Preferably, in the irradiating step, the laser beam is emitted from, of the two openings of the lateral hole, the opening located on the inner peripheral surface toward the lateral-hole mirror. According to the above-described method, the laser beam can be emitted toward the lateral-hole mirror from the inner side.

Preferably, in the disposing step, an axial-hole mirror is further disposed inside the axial hole, and in the irradiating step, the laser beam is applied to the inner surface of the lateral hole by emitting the laser beam from the opening of the axial hole in the longitudinal direction of the hollow cylindrical body toward the axial-hole mirror and making the laser beam first reflect on the axial-hole mirror and then reflect on the lateral-hole mirror. According to the above-described method, it is possible to apply a laser beam toward the lateral-hole mirror from the inner side with a simple configuration.

Preferably, in the disposing step, the axial-hole mirror is disposed inside the axial hole by inserting a rod-like axial-hole mirror rod including the axial-hole mirror at a tip thereof from the opening of the axial hole in the longitudinal direction of the hollow cylindrical body into the axial hole. According to the above-described method, the axial-hole mirror can be easily disposed inside the axial hole.

Preferably, in the disposing step, the lateral-hole mirror is disposed inside the lateral hole by inserting the rod-like lateral-hole mirror rod including the lateral-hole mirror at a tip thereof from the opening of the lateral hole located on the outer peripheral surface. According to the above-described method, the lateral-hole mirror can be easily disposed inside the lateral hole.

Preferably, the lateral-hole mirror is a concave mirror. According to the above-described method, it is possible to reduce the spot diameter of the beam spot on the inner surface of the lateral hole.

According to the present disclosure, it is possible to efficiently impart a residual compressive stress even to a part of the inner surface of the lateral hole distant from the outer peripheral surface.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
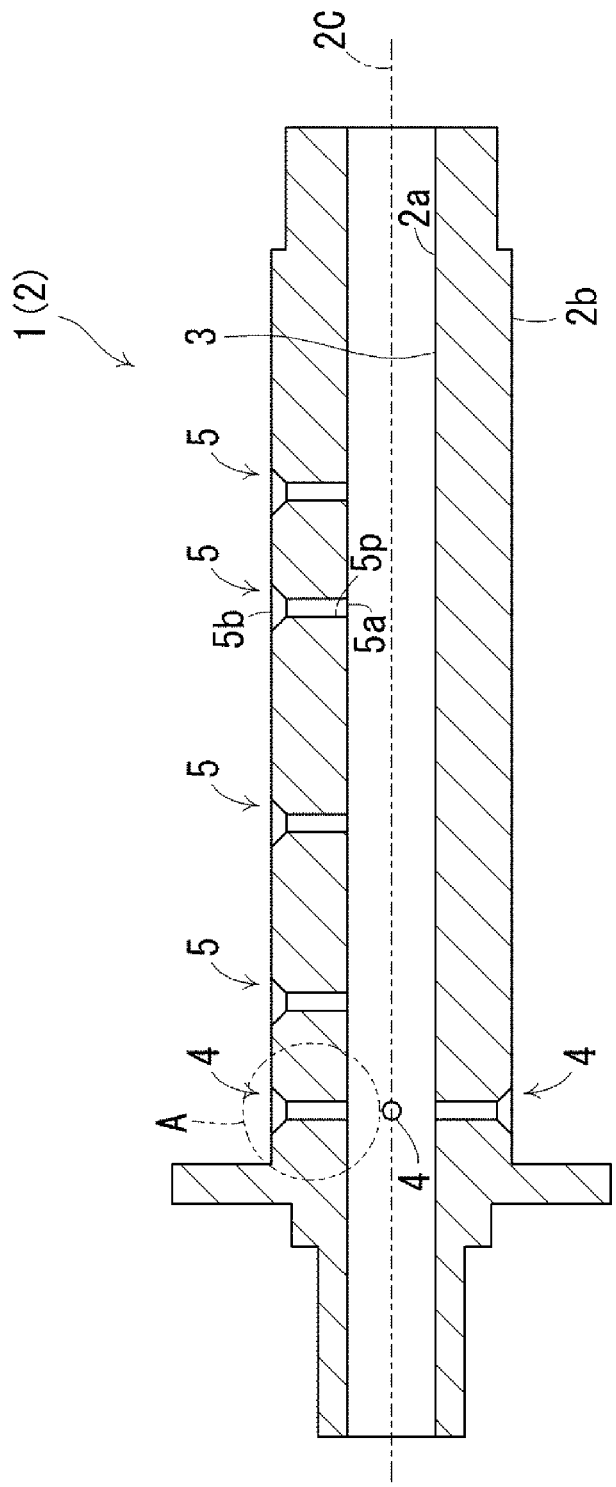
FIG. 1 is a cross section of a shaft.

Preferred embodiments according to the present disclosure have been described hereinafter with reference to the drawings.
(Shaft 1)
FIG. 1 shows a shaft 1 used for, for example, transmitting power in a drive unit of an automobile. The shaft 1 is a specific example of a power transmitting member. The power transmitting member is not limited to the shaft 1. The shaft 1 is a specific example of a component. The component is not limited to the shaft 1. The shaft 1 is manufactured by processing a workpiece 2 by performing laser peening.
(Workpiece 2)
As shown in FIG. 1, the workpiece 2 is a hollow cylindrical body. The workpiece 2 has a pipe-like shape. The workpiece 2 has a central axis 2C. The workpiece 2 has an axial hole 3. The axial hole 3 is an internal space of the workpiece 2 and extends in the longitudinal direction of the workpiece 2. The central axis of the axial hole 3 coincides with the center axis 2C of the workpiece 2. The workpiece 2 has an inner peripheral surface 2a and an outer peripheral surface 2b. The inner peripheral surface 2a is a surface that faces radially inward of the workpiece 2. The inner peripheral surface 2a defines an outer periphery (i.e., a circumference) of the axial hole 3. The outer peripheral surface 2b is a surface that faces radially outward of the workpiece 2.

The workpiece 2 has four front lateral holes 4 and four rear lateral holes 5. The four front lateral holes 4 and the four rear lateral holes 5 are specific examples of the lateral hole. The number of the front lateral holes 4 may be one, or two or more. The number of the rear lateral holes 5 may be one, or two or more. The workpiece 2 may have no front lateral hole 4 and at least one rear lateral hole 5. The workpiece 2 may have no rear lateral hole 5 and at least one forward lateral hole 4.

Figure 2:
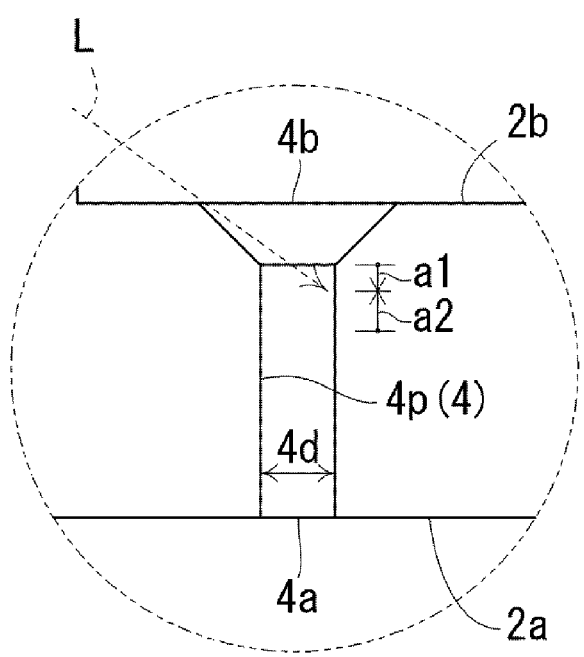
FIG. 2 is an enlarged view of a part A in FIG. 1.

The four front lateral holes 4 are formed at intervals of 90 degrees in the circumferential direction of the workpiece 2. The four front lateral holes 4 are aligned in the axial direction of the workpiece 2. Each of the four front lateral holes 4 is formed in the radial direction of the workpiece 2. Each of the four front lateral holes 4 extends in the radial direction of the workpiece 2. Therefore, among the four front lateral holes 4, two front lateral holes 4 opposed to each other across the central axis 2C have a common central axis. Similarly, the remaining two front lateral holes 4 have a common central axis. The inner diameter of each front lateral hole 4 is, for example, 1 mm to 3 mm. In FIG. 1, among the four front lateral holes 4, three front lateral holes 4 are shown. Each of the four front lateral holes 4 is opened on the inner peripheral surface 2a and the outer peripheral surface 2b. Therefore, as shown in FIG. 2, each front lateral hole 4 has an inner-side opening 4a located on the inner peripheral surface 2a and an outer-side opening 4b located on the outer peripheral surface 2b. Each front lateral hole 4 has an inner surface 4p and has an inner diameter 4d. A chamfer is formed in the outer-side opening 4b of each front lateral hole 4 so that the outer-side opening 4b broadens radially outward. The chamfer is not indispensable.

Referring to FIG. 1 again, the four rear lateral holes 5 are formed in such a manner that they are away from each other (i.e., do not adjoin each other) in the longitudinal direction of the workpiece 2. Each of the four rear lateral holes 5 is formed in the radial direction of the workpiece 2. Each of the four rear lateral holes 5 extends in the radial direction of the workpiece 2. The inner diameter of each rear lateral hole 5 is, for example, 1 to 3 mm. The four rear lateral holes 5 are opened on the inner peripheral surface 2a and the outer peripheral surface 2b. Therefore, each rear lateral hole 5 has an inner-side opening 5a located on the inner peripheral surface 2a and an outer-side opening 5b located on the outer peripheral surface 2b. Each rear lateral hole 5 has an inner surface 5p. A chamfer is formed in the outer-side opening 5b of each rear lateral hole 5 so that the outer-side opening 5b broadens radially outward. The chamfer is not indispensable.
(Problem)
Here, a problem that occurs when a residual compressive stress is imparted to the inner surface 4p of the front lateral hole 4 by performing laser peening is described with reference to FIG. 2. That is, in typical laser peening, a laser beam L is directly applied to the inner surface 4p of the front lateral hole 4 as shown in FIG. 2. In this case, the laser beam L is obliquely applied to the inner surface 4p of the front lateral hole 4. Therefore, it is difficult to reduce a spot diameter of the laser beam L on the inner surface 4p of the front lateral hole 4, thus causing a problem that the beam spot of the laser beam L elongates in an elliptic shape. In the case where a laser beam L is applied from the outer-side opening 4b of the front lateral hole 4, there is no substantial problem when the laser beam L is applied to an area a1 close to the outer-side opening 4b. However, when a laser beam L is applied to an area a2 distant form the outer-side opening 4b, the above-described elongation becomes considerably larger, thus increasing the processing time of the laser peening and/or making the laser peening itself impossible.

In particular, when the shaft 1 is used as a power transmitting member in a driving unit, the plurality of front lateral hole 4 (and the plurality of rear lateral hole 5) are formed to supply lubricating oil to a component(s) disposed around the shaft 1. Therefore, the inner diameter 4*d* of the plurality of front lateral holes 4 is determined so that the lubricating oil flows at a desired flow rate. Consequently, as described above, the diameter is small as a matter of course and hence the above-described elongation becomes larger even further.

Meanwhile, after repeatedly carrying out numerical analyses for tensile stresses, the inventors of the present application have found that it is important to include the above-described area a2 in the area to be processed by laser peening, in addition to the area a1, which has already been included in the area to be processed by laser peening in the related art. Further, based on this finding, the inventors have conceived and achieved the following novel manufacturing method.

Note that the area a1 is an area that is located radially outward of a place that is located radially inward of the outer peripheral surface 2*b* of the workpiece 2 by a distance equivalent to the inner diameter 4*d* of the front lateral hole 4. The area a2 is an area that is located radially inward of the place that is located radially inward of the outer peripheral surface 2*b* of the workpiece 2 by the distance equivalent to the inner diameter 4*d* of the front lateral hole 4.

(Manufacturing Method)

Figure 4:
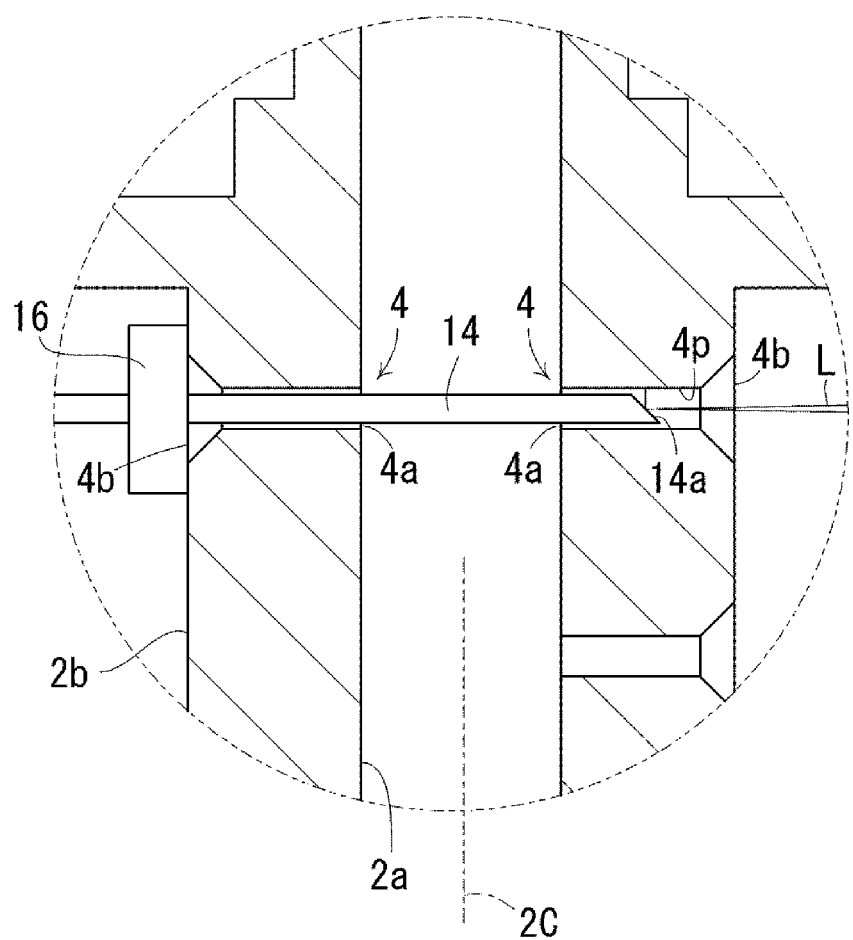
FIG. 4 is an enlarged view of a part B in FIG. 3.
Figure 5:
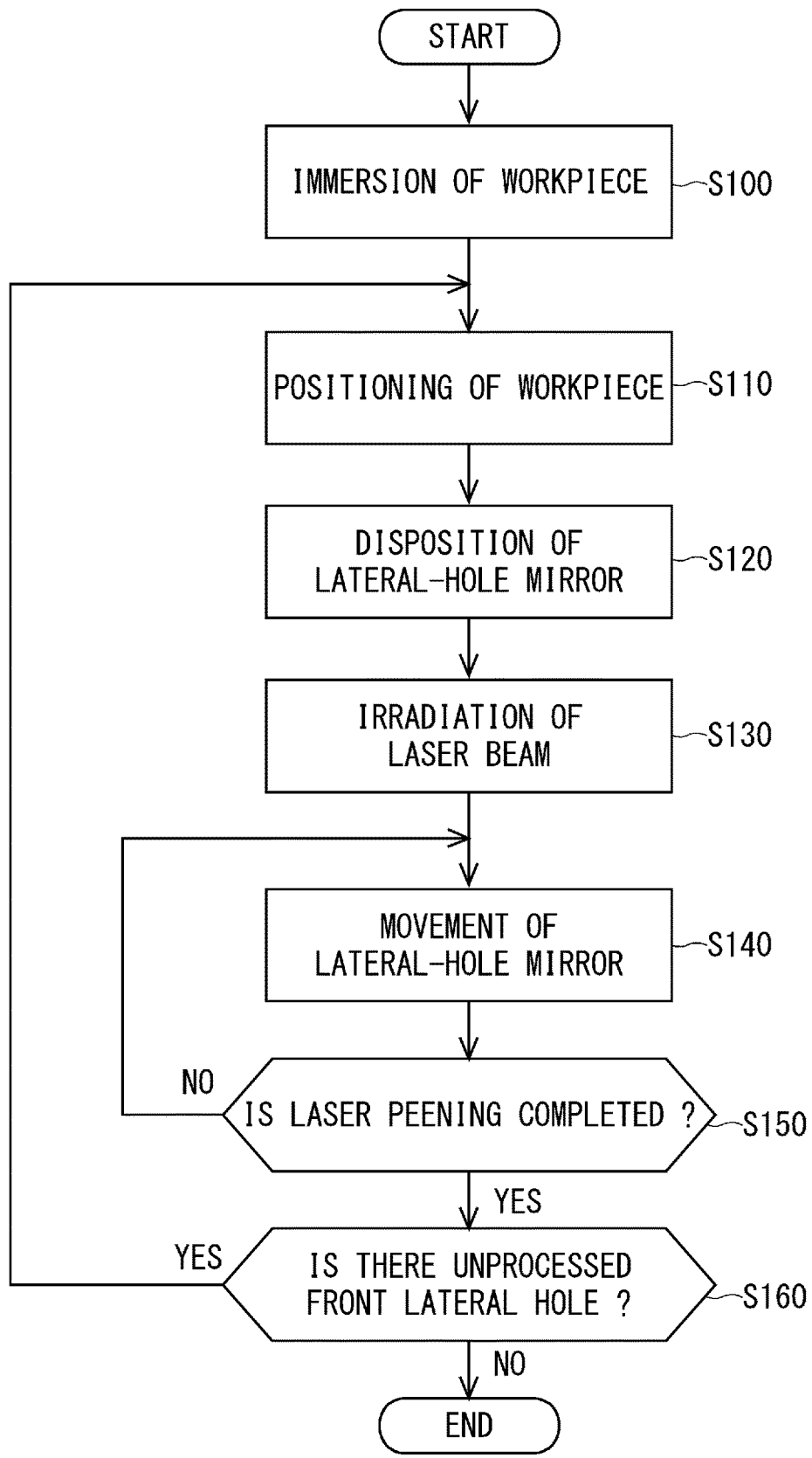
FIG. 5 is a flow of a manufacturing process for a shaft.

A method for manufacturing a shaft 1 is described hereinafter with reference to FIGS. 3 to 9. The shaft 1 is manufactured by processing inner surfaces 4*p* of a plurality of front lateral holes 4 of a workpiece 2 and inner surfaces 5*p* of a plurality of rear lateral holes 5 thereof by performing laser peening. FIGS. 5 and 9 show a flow of a manufacturing process for the shaft 1, which will be referred to as appropriate in the following description. In the following descriptions, firstly, the inner surfaces 4*p* of the plurality of front lateral holes 4 are processed by performing laser peening. Then, the inner surfaces 5*p* of the plurality of rear lateral holes 5 are processed by performing laser peening. Note that in the actual manufacturing process, the inner surfaces 5*p* of the plurality of rear lateral holes 5 may be processed before processing the inner surfaces 4*p* of the plurality of front lateral holes 4.

Figure 3:
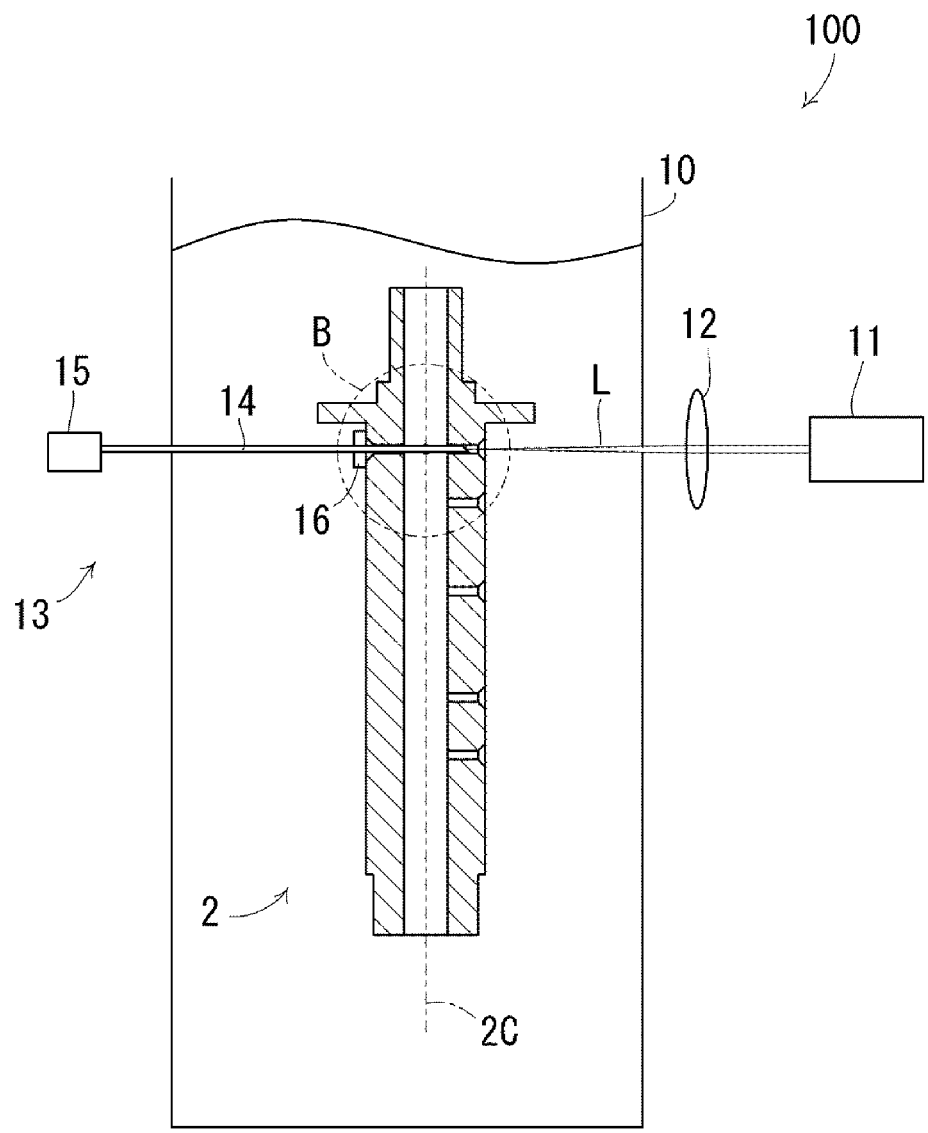
FIG. 3 is a schematic diagram of a laser peening apparatus.

FIG. 3 shows a manufacturing apparatus 100 for the shaft 1. The manufacturing apparatus 100 includes a water tank 10, a laser emitting device 11, a lens 12, and a lateral-hole mirror unit 13.

The water tank 10 has a sufficient volume to accommodate a workpiece 2 in a vertical posture. The water tank 10 is filled with water.

The laser emitting device 11 outputs (i.e., emits) a laser beam L.

The lens 12 concentrates the laser beam L output from the laser emitting device 11.

The lateral-hole mirror unit 13 reflects the laser beam L concentrated by the lens 12 and thereby makes the laser beam L incident on the inner surface 4*p* of the front lateral hole 4. The lateral-hole mirror unit 13 includes a lateral-hole mirror rod 14, a lateral-hole mirror rod drive unit 15, and a slide bearing 16. As shown in FIG. 4, the lateral-hole mirror rod 14 is a long and narrow rod having an outer diameter smaller than the inner diameter of each front lateral hole 4, and includes a lateral-hole mirror 14*a* at its tip. The lateral-hole mirror 14*a* is formed so as to reflect the laser beam L, which has entered along the longitudinal direction of the lateral-hole mirror rod 14, at a right angle with respect to the longitudinal direction of the lateral-hole mirror rod 14. Referring to FIG. 3 again, the lateral-hole mirror rod drive unit 15 supports the lateral-hole mirror rod 14 and moves the lateral-hole mirror rod 14. Note that the "movement" includes at least one or both of a rotational movement and a forward/backward movement.

Step 100: Immersion of Workpiece

Firstly, as shown in FIG. 3, the workpiece 2 is submerged in the water tank 10. Note that the workpiece 2 is submerged in the water tank 10 in such a posture that the center axis 2C of the workpiece 2 becomes vertical.

Step 110: Positioning of Workpiece

Next, by using a workpiece positioning apparatus (not shown), the workpiece 2 is positioned so that the laser beam L output from the laser emitting device 11 toward one of the four front lateral holes 4 enters that front lateral hole 4 in the longitudinal direction thereof. Note that the positioning includes moving the workpiece 2 in a vertical direction, moving the workpiece 2 in a horizontal direction, and rotating the workpiece 2 around the central axis 2C. The front lateral hole 4 to be processed is also referred to as a target front lateral hole 4 hereinafter.

Step 120: Disposition of Lateral-Hole Mirror

Next, as shown in FIG. 4, the lateral-hole mirror rod 14 is inserted from the outer-side opening 4*b* of the front lateral hole 4 that is opposed to the target front lateral hole 4 across the center axis 2C toward the target front lateral hole 4. By doing so, the lateral-hole mirror 14*a* of the lateral-hole mirror rod 14 is disposed inside the target front lateral hole 4. Note that the slide bearing 16 is disposed in advance on the outer peripheral surface 2*b* of the workpiece 2 in the vicinity of the outer-side opening 4*b* of the front lateral hole 4 opposed to the target front lateral hole 4 across the center shaft 2C. Then, by inserting the lateral-hole mirror rod 14 through the slide bearing 16, it is possible to make the central axis of the lateral-hole mirror rod 14 coincide with the central axis of the target front lateral hole 4 in a stable manner.

Step 130: Irradiation of Laser Beam

Next, a laser beam L is emitted by the laser emitting device 11. As a result, the laser beam L output from the laser emitting device 11 enters the target front lateral hole 4 from the outer-side opening 4*b* thereof, is reflected by the lateral-hole mirror 14*a* of the lateral-hole mirror rod 14, and is applied perpendicularly to the inner surface 4*p* of the target front lateral hole 4. In this manner, since the laser beam L is applied perpendicularly to the inner surface 4*p* of the front lateral hole 4, it is possible to reduce a spot diameter of a beam spot of the laser beam L and thereby to efficiently perform the processing by the laser peening.

Step 140: Movement of Lateral-Hole Mirror

Next, in order to move the beam spot of the laser beam L, the lateral-hole mirror 14*a* of the lateral-hole mirror rod 14 is moved by the lateral-hole mirror rod drive unit 15. For example, the beam spot can be moved in the circumferential direction of the inner surface 4*p* by rotating the lateral-hole mirror rod 14. Further, for example, the beam spot can be moved in the central-axis direction of the inner surface 4*p* by moving the lateral-hole mirror rod 14 forward or backward in the longitudinal direction thereof. As described above, the beam spot of the laser beam L on the inner surface 4*p* can be easily moved by rotating or moving forward/backward the lateral-hole mirror rod 14. Therefore, compared to the case where the entire workpiece 2 is rotated or moved, the processing time can be reduced and the positioning accuracy of the beam spot can be easily ensured.

Step 150: Determination 1

It is determined whether the processing by the laser peening has been completed for the areas a1 and a2 shown in FIG. 2. Then, when the processing has not been completed yet (S150: NO), the process returns to the step S140 and the processing by the laser peening is continued. When the processing has been completed (S150: YES), the process proceeds to a step S160.

Step 160: Determination 2

It is determined whether the desired processing by the laser peening has been completed for all of the four front lateral holes 4. Then, when the processing has not been completed yet (S160: YES), the process returns to the step S110 and the processing by the laser peening is continued for the remaining front lateral hole(s) 4. When the processing has been completed (S160: NO), the process is finished.

Figure 6:
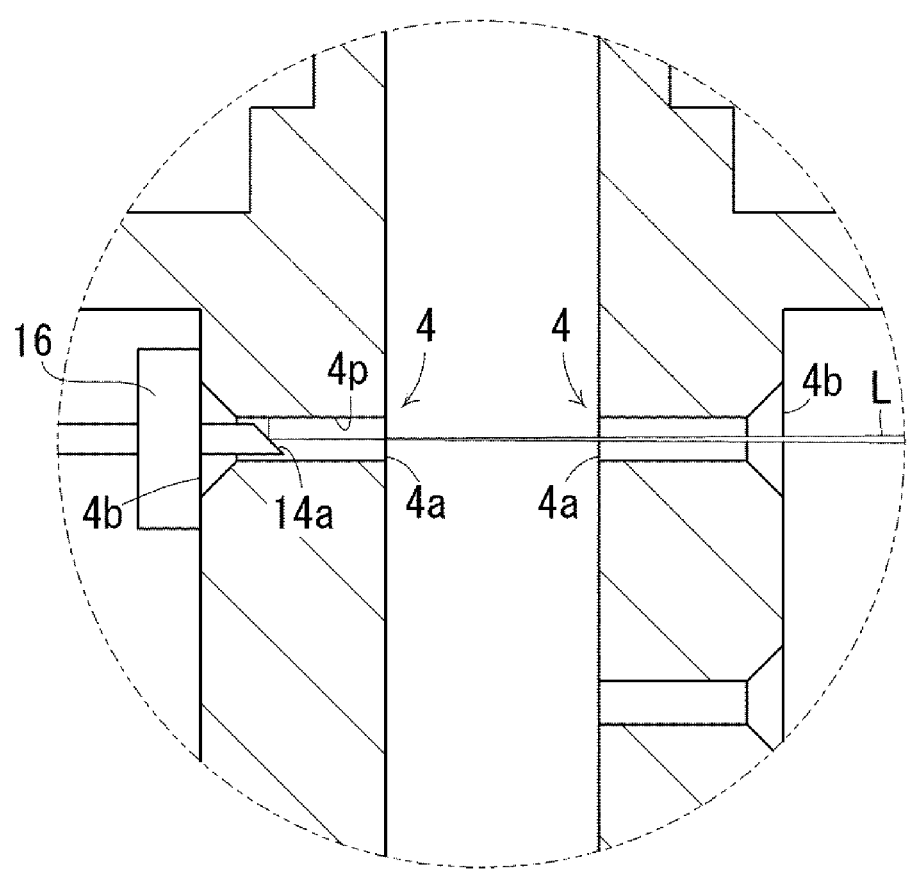
FIG. 6 is a diagram for explaining a method for continuously performing laser-peening for two opposed lateral holes.

Here, how to switch the processing target is described. One of the most ordinary ways is to pull out the lateral-hole mirror rod 14 from the workpiece 2 and rotate the workpiece 2 around the central axis 2C by 90 degrees. However, instead of the above-described method, as shown in FIG. 6, the lateral-hole mirror rod 14 may not be completely pulled out from the workpiece 2 and the lateral-hole mirror 14a of the lateral-hole mirror rod 14 may be left inside the front lateral hole 4 that is opposed to the target front lateral hole 4 across the central axis 2C. By doing so, it is possible to successively perform the processing by the laser peening for this front lateral hole 4.

Next, a method for manufacturing a shaft 1 is described with reference to FIGS. 7 to 9. A part of the method for manufacturing the shaft 1 in which inner surfaces 5p of a plurality of rear lateral holes 5 are processed by performing laser peening is described hereinafter.

Figure 7:
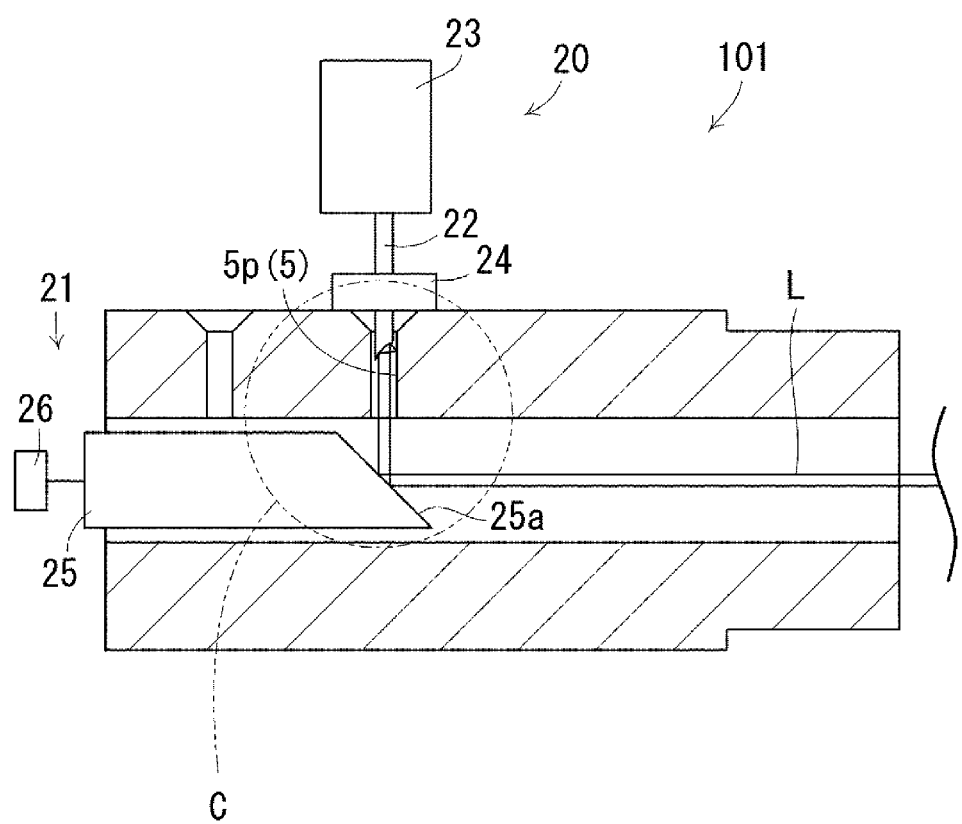
FIG. 7 is a schematic diagram of a laser peening apparatus.

FIG. 7 shows only a main part of a manufacturing apparatus 101 for the shaft 1. Similarly to the manufacturing apparatus 100, the manufacturing apparatus 101 includes a water tank, a laser emitting device, and a lens. The manufacturing apparatus 101 further includes a lateral-hole mirror unit 20 and an axial-hole mirror unit 21.

The lateral-hole mirror unit 20 reflects a laser beam L and thereby makes the laser beam L incident on the inner surface 5p of the rear lateral hole 5. The lateral-hole mirror unit 20 includes a lateral-hole mirror rod 22, a lateral-hole mirror rod drive unit 23, and a slide bearing 24. As shown in FIG. 8, the lateral-hole mirror rod 22 is a long and narrow rod having an outer diameter smaller than the inner diameter of each rear lateral hole 5, and includes a lateral-hole mirror 22a at its tip. The lateral-hole mirror 22a is formed so as to reflect the laser beam L, which has entered along the longitudinal direction of the lateral-hole mirror rod 22, at a right angle with respect to the longitudinal direction of the lateral-hole mirror rod 22. The lateral-hole mirror 22a may be a concave mirror. Referring to FIG. 7 again, the lateral-hole mirror rod drive unit 23 supports the lateral-hole mirror rod 22 and moves the lateral-hole mirror rod 22. Note that the "movement" includes at least one or both of a rotational movement and a forward/backward movement.

For each rear lateral hole, the axial-hole mirror unit 21 reflects the laser beam L that has been guided into the axial hole 3 of the workpiece 2 along its central axis 2C, and thereby makes the laser beam L incident on the lateral-hole mirror 22a disposed inside that rear lateral hole 5. The axial-hole mirror unit 21 includes a axial-hole mirror rod 25 and an axial-hole mirror rod drive unit 26. The axial-hole mirror rod 25 is a long and narrow rod having an outer diameter smaller than the inner diameter of the axial hole 3 of the workpiece 2, and includes an axial-hole mirror 25a at its tip. The axial-hole mirror 25a is formed so as to reflect the laser beam L, which has entered along the longitudinal direction of the axial-hole mirror rod 25, at a right angle with respect to the longitudinal direction of the axial-hole mirror rod 25. The axial-hole mirror rod drive unit 26 supports the axial-hole mirror rod 25 and moves the axial-hole mirror rod 25. Note that the "movement" includes at least one or both of a rotational movement and a forward/backward movement.

Step 200: Immersion of Workpiece

Firstly, the workpiece 2 is submerged in the water tank. Note that the workpiece 2 is submerged in the water tank in such a posture that the center axis 2C of the workpiece 2 becomes horizontal.

Step 210: Positioning of Workpiece

Next, by using a workpiece positioning apparatus (not shown), the workpiece 2 is positioned so that one of the four rear lateral holes 5 is opposed to the lateral-hole mirror unit 20. Note that the positioning includes moving the workpiece 2 in a vertical direction, moving the workpiece 2 in a horizontal direction, and rotating the workpiece 2 around the central axis 2C. The rear lateral hole 5 to be processed is also referred to as a target rear lateral hole 5 hereinafter.

Step 220: Disposition of Lateral-Hole Mirror

Figure 8:
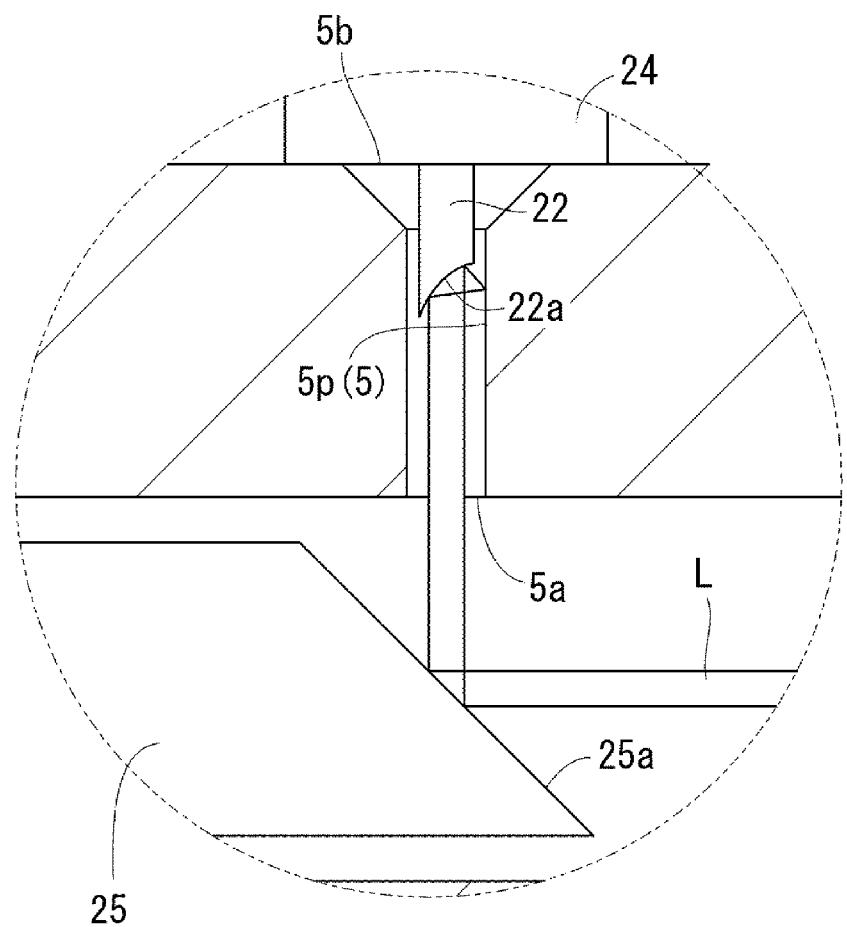
FIG. 8 is an enlarged view of a part C in FIG. 7.
Figure 9:
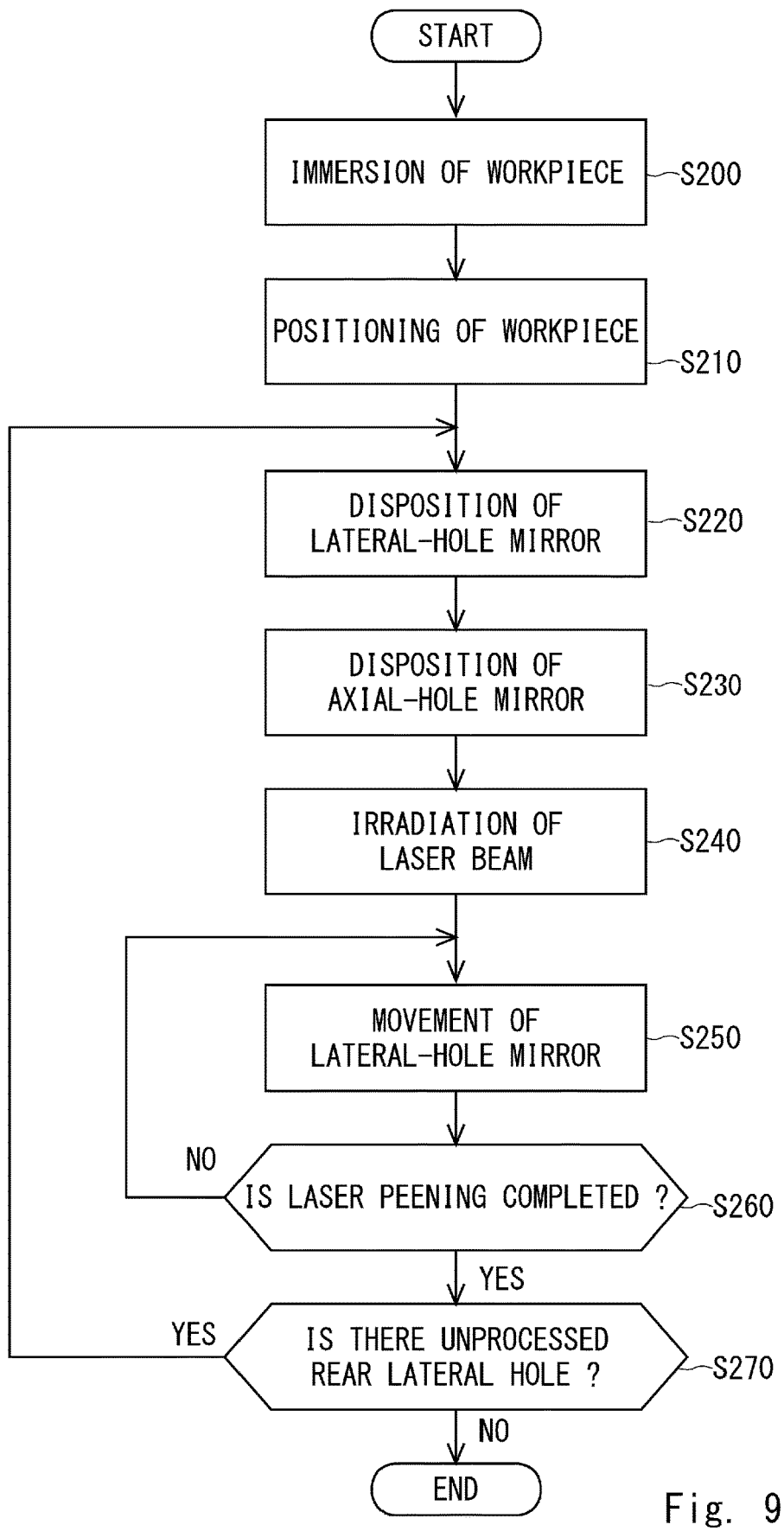
FIG. 9 is a flow of a manufacturing process for a shaft.

Next, as shown in FIG. 8, the lateral-hole mirror rod 22 is inserted from the outer-side opening 5b of the target rear lateral hole 5 and the lateral-hole mirror 22a of the lateral-hole mirror rod 22 is disposed inside the target rear lateral hole 5. Note that the slide bearing 24 is disposed in advance on the outer peripheral surface 2b of the workpiece 2 in the vicinity of the outer-side opening 5b of the target rear lateral hole 5. Then, by inserting the lateral-hole mirror rod 22 through the slide bearing 24, it is possible to make the central axis of the lateral-hole mirror rod 22 coincide with the central axis of the target rear lateral hole 5 in a stable manner.

Step 230: Disposition of Axial-Hole Mirror

Next, the axial-hole mirror rod 25 is inserted into the axial hole 3 of the workpiece 2 and the axial-hole mirror 25a of the axial-hole mirror rod 25 is disposed inside the axial hole 3 of the workpiece 2. Specifically, the axial-hole mirror 25a of the axial-hole mirror rod 25 is disposed directly below the target rear lateral hole 5. Further, the axial-hole mirror 25a is disposed so that the axial-hole mirror 25a faces upward. More specifically, the axial-hole mirror 25a is disposed so that the laser beam L, which has entered the axial hole 3 of the workpiece 2 along the longitudinal direction thereof, is reflected by the axial-hole mirror 25a at a right angle and is incident on the lateral-hole mirror 22a.

Step 240: Irradiation of Laser Beam

Next, a laser beam L is emitted by the laser emitting device. As a result, the laser beam L output from the laser emitting device enters the axial hole 3 from the opening thereof in the longitudinal direction of the workpiece 2, is first reflected by the axial-hole mirror 25a of the axial-hole mirror rod 25 and then reflected by the lateral-hole mirror 22a of the lateral-hole mirror rod 22, and is applied perpendicularly to the inner surface 5p of the rear lateral hole 5. In this manner, since the laser beam L is applied perpendicularly to the inner surface 5p of the rear lateral hole 5, it is possible to reduce a spot diameter of a beam spot of the laser beam L and thereby to efficiently perform the processing by the laser peening.

Step 250: Movement of Lateral-Hole Mirror

Next, in order to move the beam spot of the laser beam L, the lateral-hole mirror 22a of the lateral-hole mirror rod 22 is moved by the lateral-hole mirror rod drive unit 23. For example, the beam spot can be moved in the circumferential direction of the inner surface 5p by rotating the lateral-hole mirror rod 22. Further, for example, the beam spot can be moved in the central-axis direction of the inner surface 5p by moving the lateral-hole mirror rod 22 forward or backward in the longitudinal direction thereof. As described above, the beam spot of the laser beam L on the inner surface 5p can be easily moved by rotating or moving forward/backward the lateral-hole mirror rod 22. Therefore, compared to the case where the entire workpiece 2 is rotated or moved, the processing time can be reduced and the positioning accuracy of the beam spot can be easily ensured.

Step 260: Determination 1

It is determined whether the processing by the laser peening has been completed for the areas a1 and a2 shown in FIG. 2. Then, when the processing has not been completed yet (S260: NO), the process returns to the step S250 and the processing by the laser peening is continued. When the processing has been completed (S260: YES), the process proceeds to a step S270.

Step 270: Determination 2

It is determined whether the desired processing by the laser peening has been completed for all of the four rear lateral holes 5. Then, when the processing has not been completed yet (S270: YES), the process returns to the step S220 and the processing by the laser peening is continued for the remaining rear lateral hole(s) 5. When the processing has been completed (S270: NO), the process is finished.

Here, how to switch the processing target is described. That is, the lateral-hole mirror rod 22 is pulled out from the workpiece 2 and the workpiece 2 is moved forward/backward in the longitudinal direction. As a result, an unprocessed rear lateral hole 5 is opposed to the lateral-hole mirror unit 20.

Preferred embodiments according to the present disclosure have been described above. The above-described embodiments have the following features.

That is, the workpiece 2, which is a hollow cylindrical body, includes the axial hole 3 which is an internal space of the hollow cylindrical body and extends in the longitudinal direction of the hollow cylindrical body, and the front lateral hole 4 opened on the inner peripheral surface 2a and the outer peripheral surface 2b of the workpiece 2. The method for manufacturing a shaft 1 (a component) by imparting a residual compressive stress to the inner surface 4p of the front lateral hole 4 of the workpiece 2 by performing laser peening includes a disposing step (S120) and an irradiation step (S130 to S140). In the disposing step, the lateral-hole mirror 14a is disposed inside the front lateral hole 4. In the irradiating step, a laser beam L is applied to the inner surface 4p of the front lateral hole 4 by emitting a laser beam L from one of the inner-side opening 4a and the outer-side opening 4b of the front lateral hole 4 toward the lateral-hole mirror 14a and reflecting the laser beam L by the lateral-hole mirror 14a. According to the above-described method, it is possible to efficiently impart a residual compressive stress even to a part of the inner surface 4p of the front lateral hole 4 distant from the outer peripheral surface 2b. The same applies to the rear lateral hole 5.

Further, in the irradiation step, the lateral-hole mirror 14a is rotated around the center axis of the front lateral hole 4 or moved along the central axis of the front lateral hole 4 (S140). According to the above-described method, it is unnecessary to rotate the workpiece 2 itself in order to change the place where the laser peening is performed, so that the time required for manufacturing the shaft 1 can be reduced. The same applies to the rear lateral hole 5.

In the irradiation step, a laser beam L is applied to at least the area a2 of the inner surface 4p of the front lateral hole 4 that is away from the outer peripheral surface 2b in a radially inward direction by a distance equivalent to the inner diameter 4d (the minimum inner diameter) of the front lateral hole 4. According to the above-described method, a residual compressive stress is imparted to a part of the inner surface 4p of the front lateral hole 4 considerably distant from the outer peripheral surface 2b. The same applies to the rear lateral hole 5.

Further, as shown in FIG. 4, in the irradiation step, the laser beam L is emitted from, of the inner-side opening 4a and the outer-side opening 4b of the front lateral hole 4, the outer-side opening 4b located on the outer peripheral surface 2b toward the lateral-hole mirror 14a. According to the above-described method, the laser beam L can be emitted toward the lateral-hole mirror 14a from the outer side.

When the workpiece 2 further includes another front lateral hole 4 (hereinafter referred to as "the former front lateral hole 4") (an opposed hole) opened on the inner peripheral surface 2a and the outer peripheral surface 2b of the workpiece 2, which is formed on the side opposite to the above-described front lateral hole 4 (hereinafter referred to as "the latter front lateral hole 4") across the central axis 2C of the axial hole 3 and has the same central axis as the central axis of the latter front lateral hole 4, in the disposing step, the lateral-hole mirror 14a is disposed inside the former front lateral hole 4 by inserting the rod-like lateral-hole mirror rod 14 including the lateral-hole mirror 14a at a tip thereof from the outer-side opening 4b of the latter front lateral hole 4 located on the outer peripheral surface 2b toward the former front lateral hole 4. According to the above-described method, the lateral-hole mirror 14a can be easily disposed inside the former front lateral hole 4.

Further, as shown in FIGS. 7 and 8, in the irradiation step, a laser beam L is emitted from, of the inner-side opening 5a and the outer-side opening 5b of the rear lateral hole 5, the inner-side opening 5a located on the inner peripheral surface 2a toward the lateral-hole mirror 22a. According to the above-described method, the laser beam L can be emitted toward the lateral-hole mirror 22a from the inner side.

In the disposing step, the axial-hole mirror 25a is further disposed inside the axial hole 3, and in the irradiating step, a laser beam L is applied to the inner surface 5p of the rear lateral hole 5 by emitting the laser beam L from the opening of the axial hole 3 in the longitudinal direction of the workpiece 2 toward the axial-hole mirror 25a, and making the laser beam L first reflect on the axial-hole mirror 25a and then reflect on the lateral-hole mirror 22a. According to the above-described method, it is possible to apply the laser beam L toward the lateral-hole mirror 22a from the inner side with a simple configuration.

In the disposing step, the axial-hole mirror 25a is disposed inside the axial hole 3 by inserting the rod-like axial-hole mirror rod 25 including the axial-hole mirror 25a at a tip thereof from the opening of the axial hole 3 in the longitudinal direction of the workpiece 2 into the axial hole 3. According to the above-described method, the axial-hole mirror 25a can be easily disposed inside the axial hole 3.

In the disposing step, the lateral-hole mirror 22a is disposed inside the rear lateral hole 5 by inserting the rod-like lateral-hole mirror rod 22 including the lateral-hole mirror 22a at a tip thereof from the outer-side opening 5b of the rear lateral hole 5 located on the outer peripheral surface 2b. According to the above-described method, the lateral-hole mirror 22a can be easily disposed inside the rear lateral hole 5.

The lateral-hole mirror 14a and 22a may be concave mirrors. According to the above-described method, it is possible to effectively reduce a spot diameter of a beam spot on the inner surfaces 4p and 5p of the front and rear lateral holes 4 and 5.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A method for manufacturing a component by imparting a residual compressive stress to an inner surface of a lateral hole of a hollow cylindrical body by performing laser peening, the hollow cylindrical body including an axial hole and the lateral hole, the axial hole being an internal space of the hollow cylindrical body and extending in a longitudinal direction of the hollow cylindrical body, the lateral hole being opened on an inner peripheral surface and an outer peripheral surface of the hollow cylindrical body, the manufacturing method comprising:
    a disposing step of disposing a lateral-hole mirror inside the lateral hole; and
    an irradiating step of emitting a laser beam from one of the two openings of the lateral hole toward the lateral-hole mirror, making the laser beam reflect on the lateral-hole mirror, and thereby applying the laser beam to the inner surface of the lateral hole, wherein
    in the irradiating step, the laser beam is emitted from, of the two openings of the lateral hole, the opening located on the inner peripheral surface toward the lateral-hole mirror,
    in the disposing step, an axial-hole mirror is further disposed inside the axial hole, and
    in the irradiating step, the laser beam is applied to the inner surface of the lateral hole by emitting the laser beam from the opening of the axial hole in the longitudinal direction of the hollow cylindrical body toward the axial-hole mirror and making the laser beam first reflect on the axial-hole mirror and then reflect on the lateral-hole mirror.

2. The manufacturing method according to claim 1, wherein in the irradiating step, the lateral-hole mirror is rotated around a central axis of the lateral hole, or is moved along the central axis of the lateral hole.

3. The manufacturing method according to claim 1, wherein in the irradiating step, the laser beam is applied to at least an area of the inner surface of the lateral hole that is away from the outer peripheral surface in a radially inward direction by a distance equivalent to a minimum inner diameter of the lateral hole.

4. The manufacturing method according to claim 1, wherein in the disposing step, the axial-hole mirror is disposed inside the axial hole by inserting a rod-like axial-hole mirror rod including the axial-hole mirror at a tip thereof from the opening of the axial hole in the longitudinal direction of the hollow cylindrical body into the axial hole.

5. The manufacturing method according to claim 1, wherein in the disposing step, the lateral-hole mirror is disposed inside the lateral hole by inserting the rod-like lateral-hole mirror rod including the lateral-hole mirror at a tip thereof from the opening of the lateral hole located on the outer peripheral surface.

6. The manufacturing method according to claim 1, wherein the lateral-hole mirror is a concave mirror.

* * * * *